US009668556B2

(12) United States Patent
Senatori

(10) Patent No.: US 9,668,556 B2
(45) Date of Patent: Jun. 6, 2017

(54) ADJUSTABLE DISPLAY HOUSING ASSEMBLY

(71) Applicant: HEWLETT-PACKARD DEVELOPMENT COMPANY, L.P., Houston, TX (US)

(72) Inventor: Mark David Senatori, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/786,346

(22) PCT Filed: Jul. 29, 2013

(86) PCT No.: PCT/US2013/052586
§ 371 (c)(1),
(2) Date: Oct. 22, 2015

(87) PCT Pub. No.: WO2015/016816
PCT Pub. Date: Feb. 5, 2015

(65) Prior Publication Data
US 2016/0128439 A1 May 12, 2016

(51) Int. Cl.
G06F 1/16 (2006.01)
A45C 11/00 (2006.01)

(52) U.S. Cl.
CPC .............. *A45C 11/00* (2013.01); *G06F 1/162* (2013.01); *G06F 1/1616* (2013.01);
(Continued)

(58) Field of Classification Search
CPC ...... G06F 1/1681; G06F 1/162; G06F 1/1679; G06F 1/1632; G06F 1/1654;
(Continued)

(56) References Cited

U.S. PATENT DOCUMENTS

| 5,168,426 | A | 12/1992 | Hoving et al. |
| 7,184,263 | B1 | 2/2007 | Maskatia |
| 7,586,743 | B2 | 9/2009 | Lin |
| 2003/0046793 | A1* | 3/2003 | Novin .................. G06F 1/1616 16/342 |

(Continued)

FOREIGN PATENT DOCUMENTS

| JP | 2005-174348 A | 6/2005 |
| JP | 2007-004212 A | 1/2007 |

(Continued)

OTHER PUBLICATIONS

Bray, J.; "Acer Aspire R7 Review: First Look"; May 3, 2013; 5 pages.

*Primary Examiner* — James Wu
(74) *Attorney, Agent, or Firm* — HP Patent Department

(57) ABSTRACT

Implementations of the present disclosure disclose an adjustable display housing assembly. According to one implementation, the adjustable display housing assembly comprises a base housing and a display panel housing. Furthermore, a first hinge is attached to the base housing and a moveable arm extends from the first hinge at a first end to a second hinge at an end opposite the first end. In addition, a flexible mounting plate is included to attach the second hinge to the display housing. When the display housing is placed in a closed position, a pivot point associated with the second hinge is retracted by the flexible mounting plate. And when the display housing is placed in a first viewing position, the pivot point associated the second hinge extends away from the display housing.

21 Claims, 8 Drawing Sheets

(52) U.S. Cl.
CPC ...... *G06F 1/1681* (2013.01); *A45C 2011/003* (2013.01); *A45C 2200/15* (2013.01); *G06F 1/1607* (2013.01); *G06F 1/1654* (2013.01)

(58) Field of Classification Search
CPC ..... G06F 1/1607; G06F 1/1616; A45C 11/00; A45C 2011/003; A45C 2200/15; A45C 2011/002; Y10S 248/917
USPC ........................................ 361/679.09, 679.59
See application file for complete search history.

(56) References Cited

U.S. PATENT DOCUMENTS

| | | |
|---|---|---|
| 2005/0078444 A1 | 4/2005 | Hong |
| 2007/0058331 A1 | 3/2007 | Schwager et al. |
| 2008/0024975 A1 | 1/2008 | Huang |
| 2012/0044155 A1 | 2/2012 | Nakada |
| 2013/0128443 A1* | 5/2013 | Tseng .................... G06F 1/1616 361/679.12 |
| 2014/0185218 A1 | 7/2014 | Chen |
| 2016/0252927 A1* | 9/2016 | Senatori ................ G06F 1/1681 |
| 2016/0252930 A1* | 9/2016 | Senatori ................ G06F 1/1616 |

FOREIGN PATENT DOCUMENTS

| | | |
|---|---|---|
| JP | 2007004212 A * | 1/2007 |
| KR | 10-2008-0034646 A | 4/2008 |
| TW | M261970 | 4/2005 |
| TW | I295705 | 4/2008 |
| TW | M453878 U1 | 5/2013 |
| TW | M454569 U1 | 6/2013 |

* cited by examiner

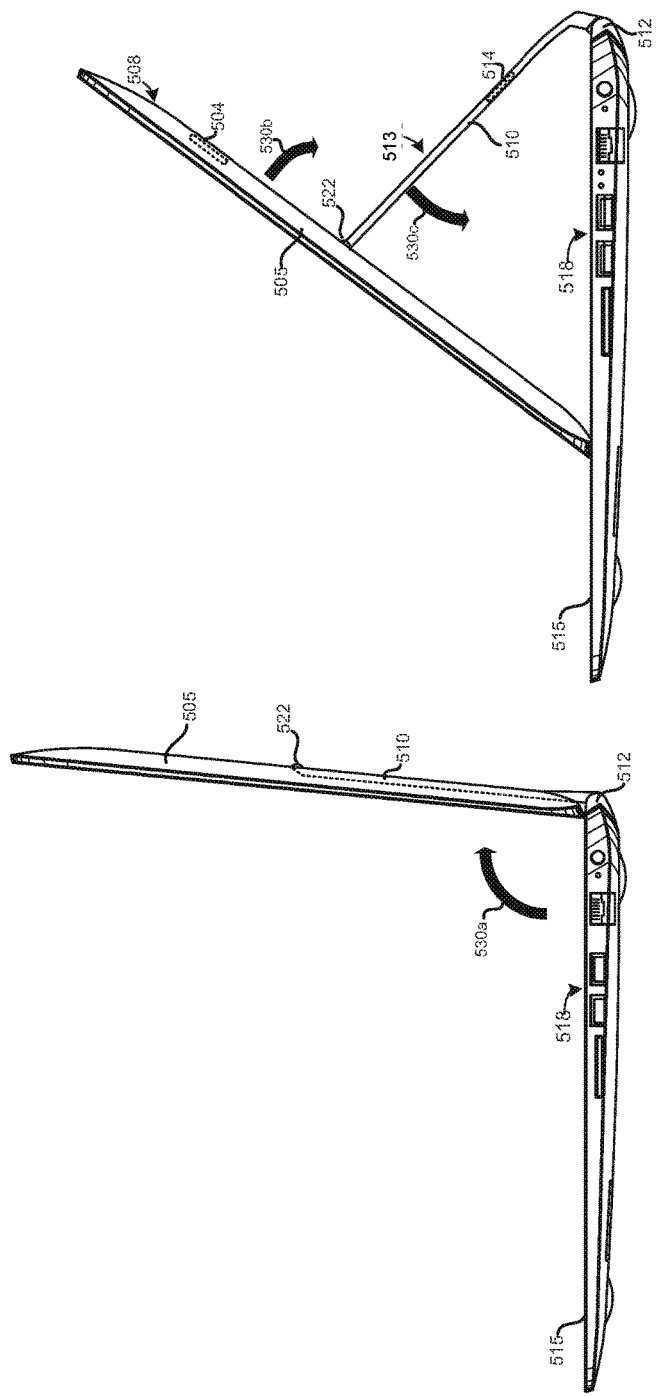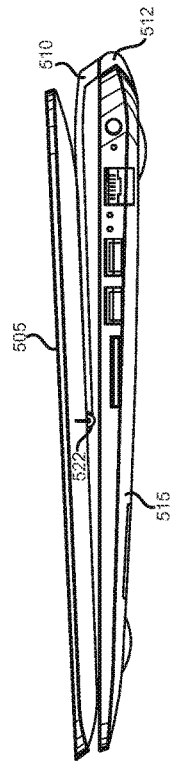

ADJUSTABLE DISPLAY HOUSING ASSEMBLY

BACKGROUND

The emergence and popularity of mobile computing has made portable electronic devices, due to their compact design and light weight, a staple in today's marketplace. Within the mobile computing realm, notebook computers are one of the most-widely used devices and generally employ a clam-shell type design consisting of two housings connected together at a common end via a hinge for example. In most cases, a first or display housing is utilized to provide a viewable display to a user while a second housing includes an area for user input (e.g., touchpad and keyboard). Furthermore, convertible notebook computers typically include a base housing for enabling standard input (e.g., keyboard) along with an attached touchscreen display housing for accepting user input and displaying images to an operating user. Meanwhile, the hinge mechanism is used to facilitate movement and articulation of the display housing along a common axis.

BRIEF DESCRIPTION OF THE DRAWINGS

The features and advantages of the present disclosure as well as additional features and advantages thereof will be more dearly understood hereinafter as a result of a detailed description of implementations when taken in conjunction with the following drawings in which:

FIG. 5A is a side profile view of the adjustable display housing assembly in a normal open position, FIG. 5B is a side profile view of the adjustable display housing assembly in a an inclined viewing position, while FIG. 5C is a side profile view of the adjustable display housing assembly in a reclined viewing position according to an example implementation.

DETAILED DESCRIPTION OF THE INVENTION

Figure 1A:
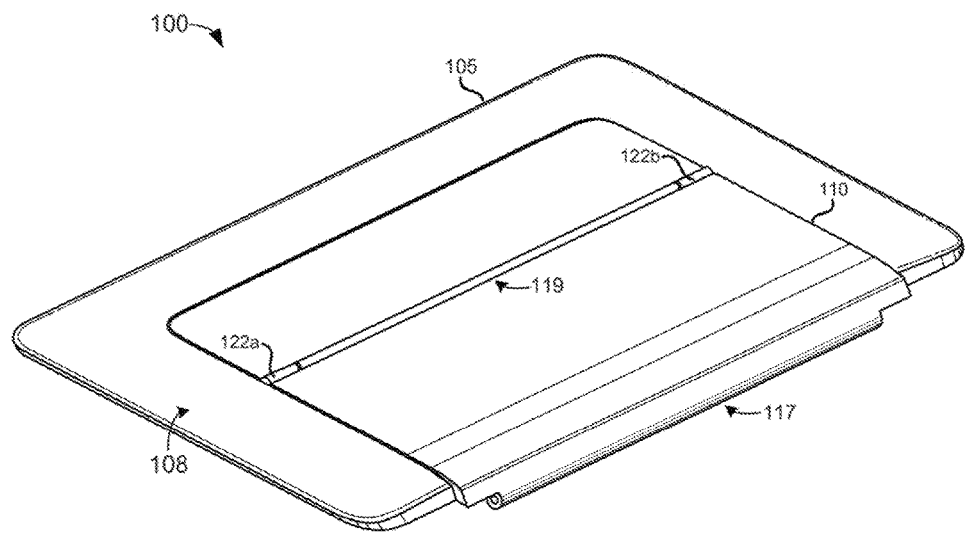
FIGS. 1A and 1B are three-dimensional perspective views of the adjustable display housing assembly according to an example implementation.

The following discussion is directed to various examples. Although one or more of these examples may be discussed in detail, the implementations disclosed should not be interpreted, or otherwise used, as limiting the scope of the disclosure, including the claims. In addition, one skilled in the art will understand that the following description has broad application, and the discussion of any implementations is meant only to be an example of one implementation, and not intended to intimate that the scope of the disclosure, including the claims, is limited to that implementation. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in a first figure, and a similar element may be referenced as 243 in a second figure. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense Manufactures and users alike desire a notebook that allows for multiple positioning. Prior solutions include a large cutout on the back of the panel housing for allowing full clearance of the hinge when the display housing is completed rotated. Other solutions further include hard stops formed onto the pivot points to prevent articulation of the housing past a certain point. However, each of these solutions are unable provide a display housing capable of having a substantially reversed flat orientation in which the display is visible while abutting the base housing.

Implementations of the present disclosure provide an adjustable display housing assembly for a portable electronic device. According to one example, the adjustable display housing assembly includes at least two hinge pivot points with at least one pivot point positioned behind the display housing. Still further, a flexible support bracket is utilized to allow the display housing to fold back onto itself without causing damage. As such, the adjustable display housing allows for near infinite positioning by an end user including a substantially flat tablet-like orientation.

Figure 1B:
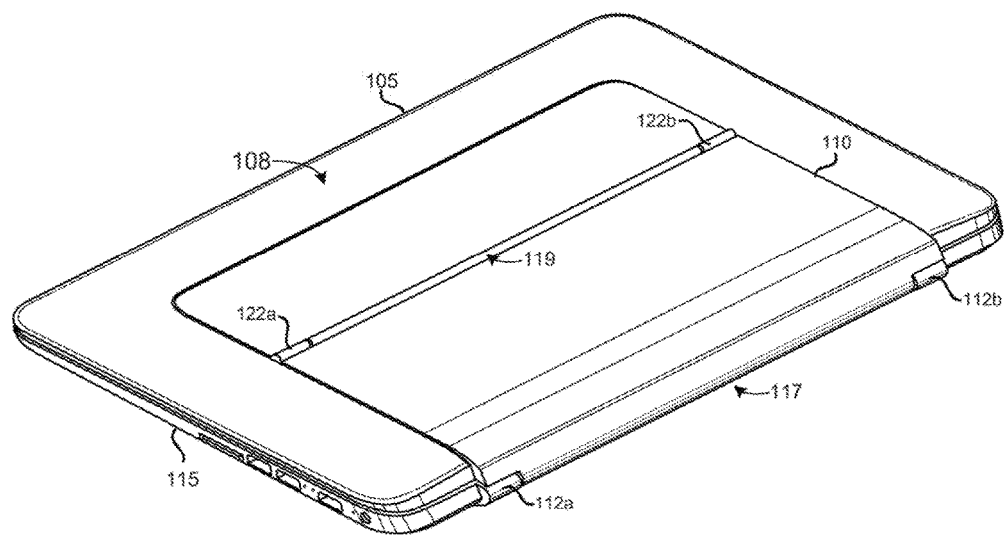

Referring now in more detail to the drawings in which like numerals identify corresponding parts throughout the views, FIGS. 1A and 1B are three-dimensional perspective views of the adjustable display housing assembly according to an example implementation. As shown in FIG. 1A, the mechanical system of the present disclosure includes a notebook computer 100 having a base housing 115 and an adjustable display housing assembly 105. In one implementation, the display housing 105 includes a touch-enabled liquid crystal display (LCD) module or the like, as well as other possible elements including a web camera, speakers, and antennas for example. However, the display housing may also use a non-touch LCD module as well. In some implementations, the display housing 105 may include the main system electrical printed circuit board while the base housing 115 only contains a keyboard and basic I/O ports and functionality. The panel housing assembly 105 includes a hinge support arm 110 having a lower pivot end 117 and an upper pivot end 119. Moreover, the hinge support arm is attached to a rear surface 108 of the display housing 105 via upper hinge elements 122a and 122b along the upper pivot end 119. And as shown in FIG. 1B, the hinge arm joins the display housing 105 with the base housing 115 along the lower pivot end 117 via lower hinge elements 112a and 112b.

Figure 2A:
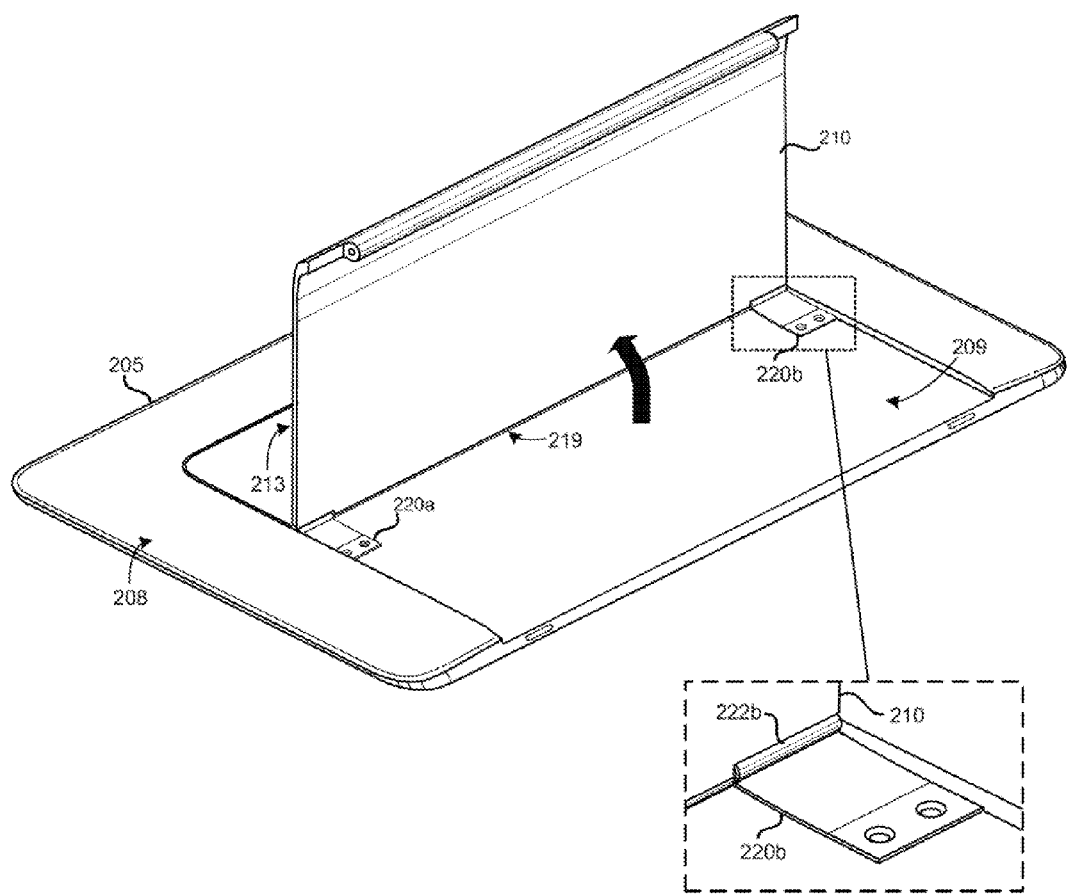
FIGS. 2A-2C are three-dimensional perspective views of the arm articulation for the adjustable display housing assembly according to an example implementation.
Figure 2B:
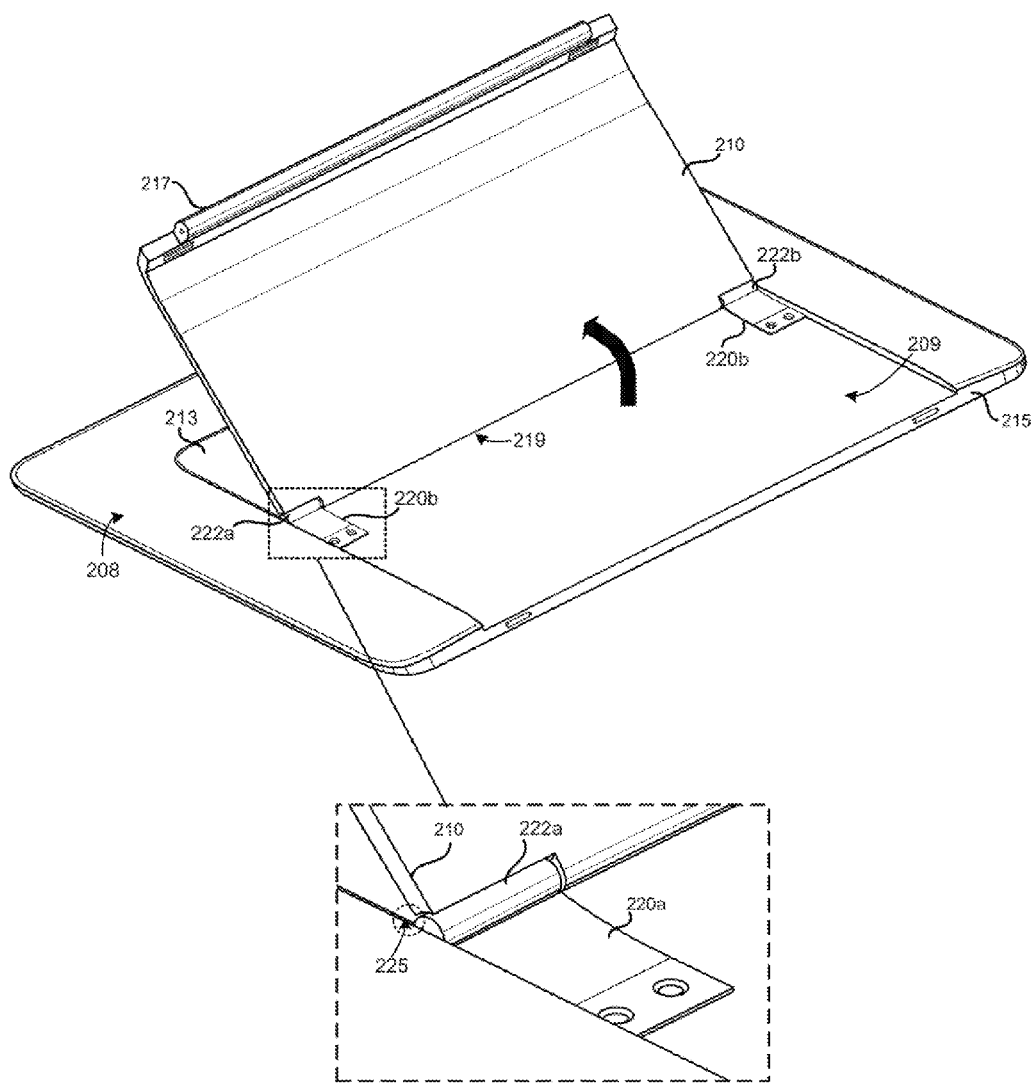
Figure 2C:
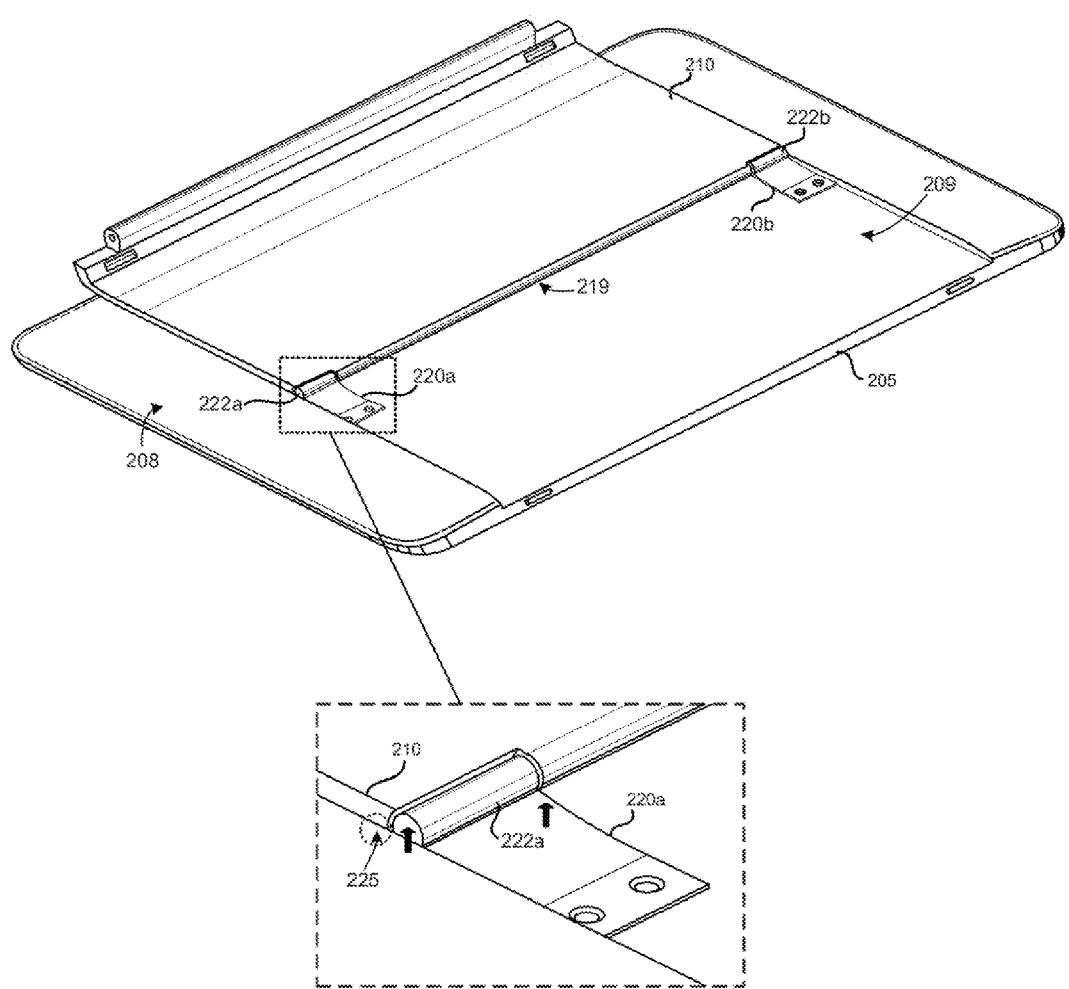

Referring now to FIGS. 2A-2C, which are three-dimensional perspective views of the arm articulation for the adjustable display housing assembly according to an example implementation. As shown in the example of FIG. 2A, the upper hinge elements 222a and 222b are attached to the back surface 208 of the display housing 205 via flexible support brackets 220a and 220b. In one example, the flexible support brackets 220a and 220b represent a spring steel hinge that is formed to move freely and may be biased in one direction so as to hold the associated upper hinge elements 222a and 222b against the back surface 208 of the display panel 205. In one implementation, the flexible support brackets 220a and 220b are attached to the back surface 208 of the panel housing 205 using a mechanical fastener such as screws, rivets, or epoxy like adhesives. Alternatively, the support brackets 220a and 220b may also be welded onto the cavity area 209 on the rear side 208 of the display panel 205. The cavity area 209 is slightly more recessed on the rear surface 208 of the display housing and serves as an area for the support arm 210 to rest when the device is in a closed position so as to provide a flush and level (i.e., forming the same plane) rear surface side 208 including the support arm 210. That is, when the display panel 205 is closed—positioning the display side (side opposite rear side 208) of the panel 205 immediately adjacent to the base housing (115 of FIG. 1B)—the support arm 210 is formed to correspond to a shape and size of the cavity area 209 so as to provide an entirely flush or level surface on the rear side 208 of the display housing 205. According to one implementation, the flexible support arm 210 and the upper hinge elements 222a, 222b are preassembled together and installed into the panel housing is such a manner that the support brackets 220a, 220b are "spring-loaded" to hold the hinge elements 222a, 222b against the rear surface 208 of the panel housing 205.

Furthermore, as the display panel 205 rotates along an upper pivot axis corresponding with the upper pivot end 219, the upper hinge elements 222a and 222b do not move in relation to the panel housing 205. However, at a certain point (e.g., about 100° open angle), the rear surface of the display panel 205 will eventually contact the hinge arm 210 as shown in FIG. 2B. At such a point (i.e., interference point 225 in enlarged view), the panel housing 205 can continue to rotate except that its rotation point shifts to the interference point 225 where the panel housing 205 and hinge arm 210 abut as shown in FIG. 2C. That is, as the display housing 205 continues to rotate about the interference point 225, the display housing 205 forces the hinge support arm 210 upward as indicated by the directional arrow in the enlarged view of FIG. 2C. More particularly, the flexible support brackets 220a and 220b enable the hinge elements 222a and 222b to translate in a corresponding upward direction (e.g., 1 mm) and to a point where the panel housing 205 has rotated nearly 180° and is substantially parallel and in direct contact with a rear side of the hinge arm 210 (i.e., rear arm side 213 in FIG. 2A).

Figure 3A:
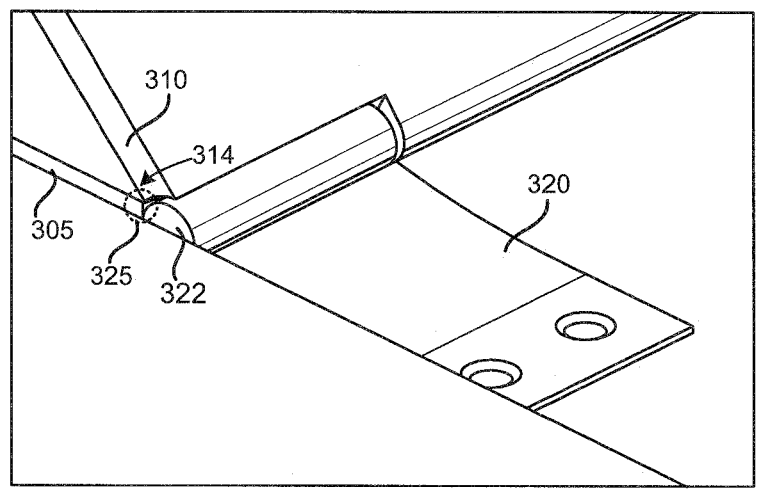
FIGS. 3A and 3B are enlarged views of an upper hinge element for the adjustable display housing assembly according to an example implementation.
Figure 3B:
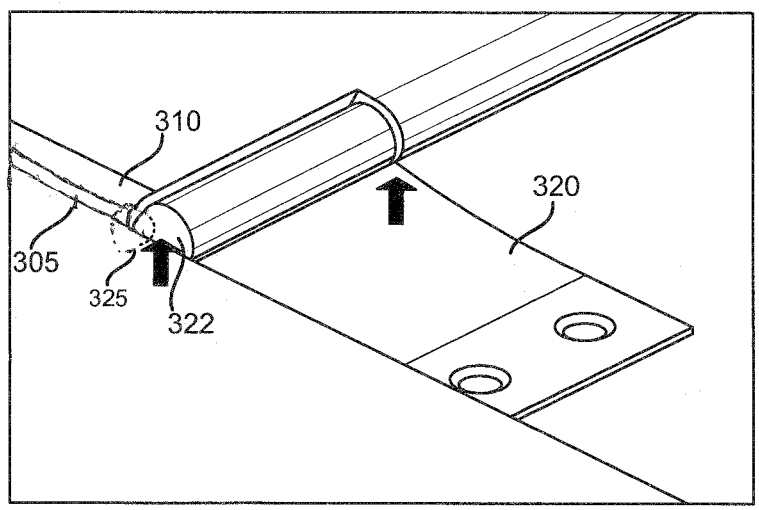

FIGS. 3A and 3B are enlarged views of an upper hinge element for the adjustable display housing assembly according to an example implementation. As shown here, the upper hinge element 322 joins the support arm 310 with the display panel housing 305, and corresponds with the pivot point of the display panel 305 with respect to the support arm 310. The upper hinge element 322 may be a two piece hinge member so as to provide channels and allow electrical communication between adjacent housings. In one example, the upper hinge element 322 may comprise of five segments known as knuckles to one of ordinary skill in the art. In such an implementation, the two outer-most segments attach to the flexible support arm 310 and panel housing 305, while two inner segments are attached to the hinge arm 310 and contain both the frictional element of the hinge element 322 as well as a channel to pass electrical cables through to a center segment of the hinge element 322.

Additionally, the hinge element 322 may be fixed onto the panel housing 305 via a flexible mount bracket 320. As mentioned in the previous example, the interference point 325 occurs when a lower end 314 of the support arm abuts a rear surface of the display panel 305 as shown in FIG. 3A. Here, the adjustable panel assembly is in an inclined viewing position. When the display panel 310 is rotated further along the interference point 325, the flexible bracket 320 and hinge element 322 are configured to extend in a direction away (as indicated by directional arrows) from the rear surface of the display housing 305 as shown in FIG. 3B. When in this reclined position, the pivot point 322 raised so that the support arm 310 and the display housing 305 may be placed substantially flat and parallel with the base housing.

Additionally, there may be some material wear at the interference point 325 where the panel housing 305 and hinge arm 310 come into contact—a result that would be cosmetically undesirable. As such, a wear strip or rubber bumper may be added near the interference point 325. Additionally, a cam lobe may be included on the hinge element 322 such that when rotated close to the interference point 325, the cam lobe engages another feature that encompasses the interference point 325 so as to prevent any cosmetic issues with the visible surfaces.

Figure 4:
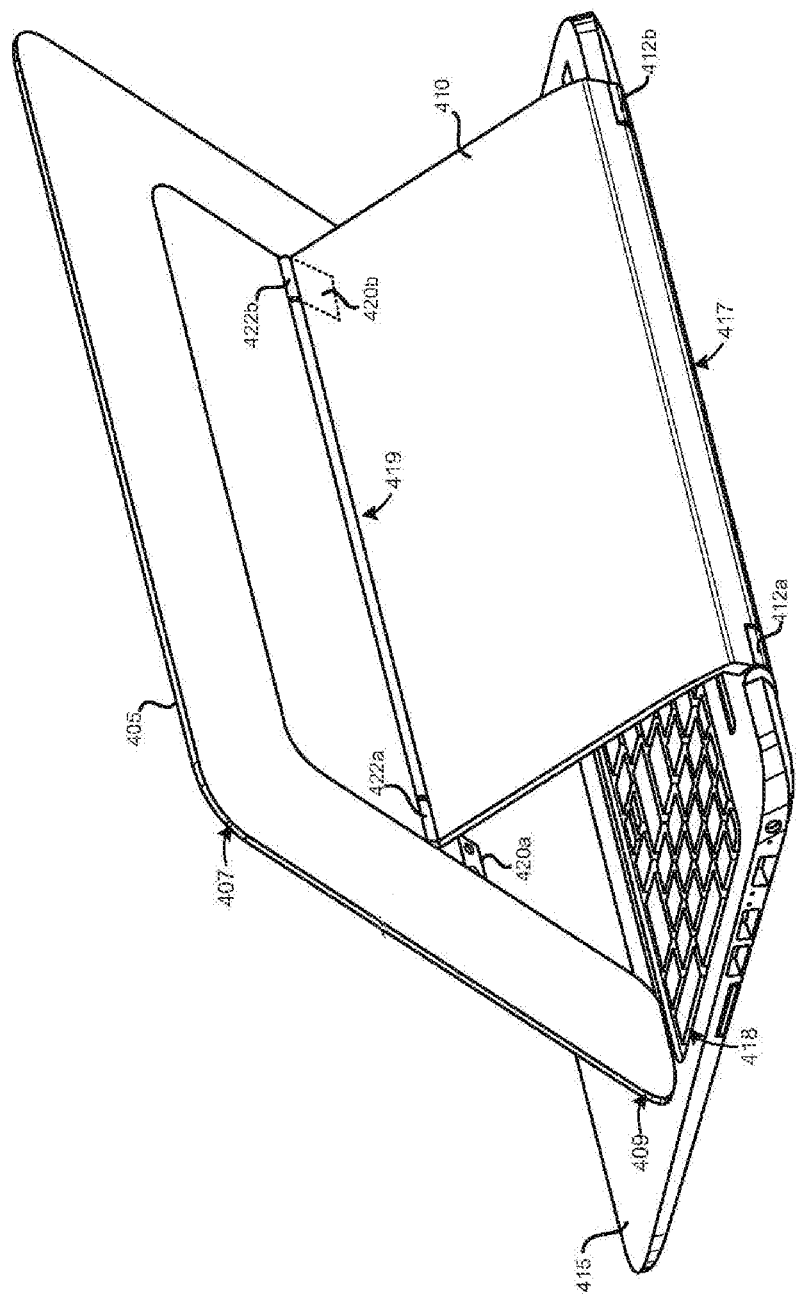
FIG. 4 is a three-dimensional perspective view of the adjustable display housing assembly in an inclined viewing position according to an example implementation.

FIG. 4 is a three-dimensional perspective view of the adjustable display housing assembly in a normal viewing position according to an example implementation. According to one example, the articulating display housing 405 is able to pivot about two axis points 417 and 419. The upper pivot point (corresponding with upper joining end 419) utilizes an extended support arm 410, which is connected to the base housing 415 at a first end 417 and to hinge pivot elements 422a, 422b on the back of the display housing 405 at an opposite end 419 thereof. Moreover, support brackets 420a and 420b are used to provide a fixing mechanism for joining the upper hinge elements 422a and 422b. Meanwhile, the lower pivot point (corresponding with common end 417) may also use a conventional hinge pivot mechanism via lower hinge elements 412a, 412b formed along the lower joining end (common end 419). The hinge elements 412a, 412b may be integrated with either the base housing 415 or support arm 410 for providing rotational movement of the support arm along the lower pivot point/common end 417.

In one example, the lower hinge elements 412a, 412b include frictional elements such as a stacked washer-type hinge, or similar mechanism. Similarly, the upper hinge pivot elements 422a, 422b, which join the display housing 405 with the hinge arm 410, may also utilize a conventional hinge pivot mechanism or frictional element. As shown here, when positioned in the inclined operating position, the display housing 405 is positioned such that a top end 407 of the display housing 405 extends away and behind the upper hinge elements 422a and 422b, while a lower end 409 of the display housing 405 rests on an upper surface of the base housing 415 and in front of a keyboard input area 418 (e.g., keyboard 418 not visible when viewed from front of device). Such an arrangement provides a solid resting platform for the display housing so as to provide a stability control during touch input operation. Moreover, positioning of the lower end 409 of the display housing in front of the keyboard input area 418 provides for a visually-appealing environment during touch-only operation of the display and panel housing 405.

FIG. 5A is a side profile view of the adjustable display housing assembly in a normal open position, FIG. 5B is a side profile view of the adjustable display housing assembly in an inclined viewing position, while FIG. 5C is a side profile view of the adjustable display housing assembly in a reclined viewing position according to an example implementation. According to one example, the upper hinge element 522 and lower hinge element 512 operate independently of each other. For example, an operating user may elect to open the display housing 505 from a closed position (i.e., panel housing 505 placed immediately adjacent to base housing 515) to an open position as shown in FIG. 5A. To this end, the lower hinge element 512 is coupled to the support arm 510 and attached display housing 505 to rotate (as indicated by directional arrow 530a) along the lower pivot axis and allow the device 500 to open as a conventional notebook.

While in the open position of FIG. 5A (and at any point), an operating user may then rotate the display housing 505 about the upper hinge element 522 and associated pivot point as indicated by the directional arrow 530b. Accordingly, the panel housing is adjusted to an inclined position as shown in FIG. 5B. More specifically, a back surface 508 of the panel housing 505 is moved down and toward a back surface 513 of the support arm 510. As the panel housing 505 is articulated further downward, the support arm 510 eventually pivots and articulates downward and toward the keyboard input area 518 as indicated by directional arrow 530c. As shown here, the upper pivot point 522 allows the user to maintain an optimal viewing angle, while at the same time bringing the display housing 505 closer to the user. Furthermore, the upper hinge element 522 may provide a fixation point that allows the lower front edge of the display housing 505 to float over or contact the base housing 515 for stability support.

Implementations of the present disclosure allow for numerous positional adjustments of the display housing with respect to the base housing 515. As shown in FIG. 5C, the adjustable panel assembly may be further adjusted from the inclined position (FIG. 5B) to a reclined or recumbent position in which a back surface 508 of the display housing 505 eventually abuts the rear surface 513 of the support arm 510. For example, the user may bring the lower front edge of the display housing 505 towards the user to a point in which the viewing angle of the display housing 505 is substantially flat or parallel with the normal surface and base housing 515. Moreover, and in accordance with one implementation, the display housing 505 may be held against a rear surface of the hinge arm 510 using attachment features 504 and 514. For instance, the attachment features 504 and 514 may be comprise of a mechanical or magnetic latch, or a combination of both formed on the rear side of the panel housing 505 and hinge arm 510 respectively.

Still further, the points at which the display housing 505 contacts the base housing 515 can be at a single fixed position, or have infinite positions. The points of fixation can be either exposed features, such as raised bump features, or recessed features such as divots that the lower part of the display housing 505 fall within. The points of fixation can also include hidden mechanical features such as magnets or physical catches for example.

Figure 6A:
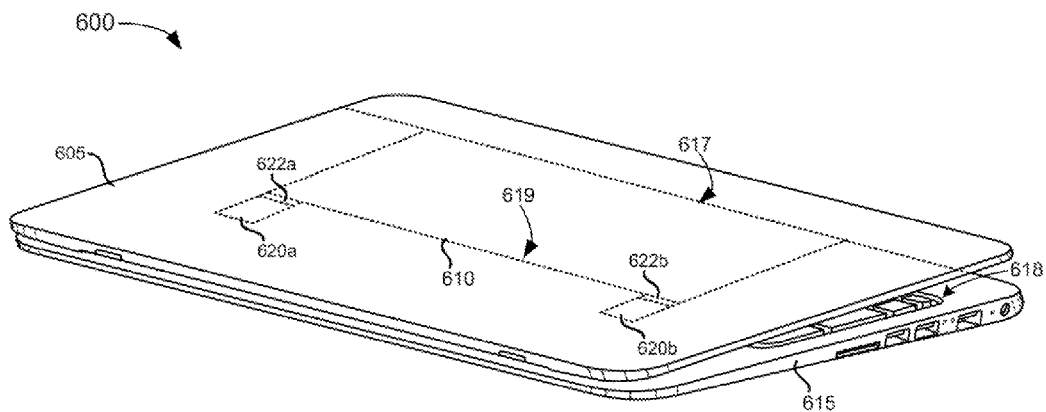
FIGS. 6A and 6B are three-dimensional views of the adjustable display housing assembly in the reclined viewing position according to an example implementation.
Figure 6B:
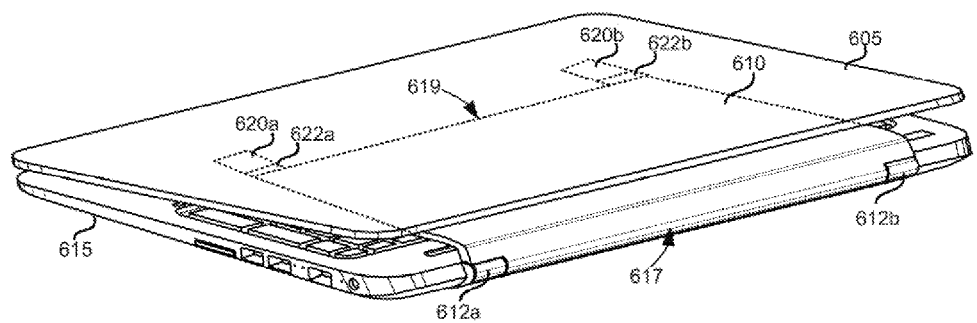

FIGS. 6A and 6B are three-dimensional views of the adjustable display housing assembly in the reclined viewing position according to an example implementation. As shown here, the adjustable display housing assembly 600 is positioned in a reclined viewing mode such that a display surface of the panel housing 605 is facing upwards in a direction perpendicular to the normal surface. Pivot rotation is accomplished along the first pivot point 617 via lower hinge elements 612a, 612b, while pivot rotation along the second or upper pivot point is accomplished via the upper hinge elements 622a, 622b. Moreover, flexible mounting brackets 620a, 620b are used to hold the upper hinge elements 622a, 622b along the rear surface of the display panel 605. Upon articulation of the panel housing 605 past an interference point (as shown in FIG. 3), the hinge elements 622a, 622b and pivot points thereof receive external force via contact of the support arm 610 and housing 605 and start to extend away from the rear surface of the panel housing 605. As mentioned above, while in the reclined position the panel housing 605 is substantially flat and thus covers the keyboard area 618 and an upper surface of the base housing 615.

Implementations of the present disclosure provide an adjustable display housing assembly for a portable electronic device. Moreover, many advantages are afforded by the adjustable display housing assembly according to implementations of the present disclosure. For instance, implementations described herein allow the end user to adjust the panel housing in infinite positions with respect to the base housing so as to produce the most desirable viewing angle for the user. Moreover, utilizing the flexible spring mounting bracket allows the panel housing to fold back on itself without damaging the housings, thus providing a near flat tablet-like orientation (e.g., 180° rotation). Furthermore, when the device is in a closed state, the hinge element is retracted into the panel housing thereby maintaining a thin form factor.

Furthermore, while the disclosure has been described with respect to particular examples, one skilled in the art will recognize that numerous modifications are possible. For instance, although examples described herein depict a notebook computer as the portable electronic device, the disclosure is not limited thereto. For example, the portable electronic device may be a netbook, multimedia player, monitor, cell phone, smart phone, or any other electronic device having a clam-shell housing arrangement.

Not all components, features, structures, characteristics, etc. described and illustrated herein need be included in a particular example or implementation. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some examples have been described in reference to particular implementations, other implementations are possible according to some examples. Additionally, the arrangement o order of elements or other features illustrated in the drawings or described herein need not be arranged in the particular way illustrated and described. Many other arrangements are possible according to some examples.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An adjustable display housing assembly comprising:
   a base housing;
   a display panel housing;
   a first hinge attached to the base housing;
   a moveable arm extending from the first hinge at a first end, wherein the display panel housing comprises a cavity area that is recessed into a rear surface of the display panel housing, the moveable arm to rest in the cavity area when the base housing and the display panel housing are in a closed position;
   a second hinge attached to the moveable arm at a second end opposite the first end; and
   a flexible mounting plate to attach the second hinge to the display panel housing, wherein when the display panel housing and the base housing are in the closed position, a pivot point associated with the second hinge is retracted by the flexible mounting plate to a retracted position,
   wherein when the display panel housing is in a first viewing position where the rear surface of the display panel housing abuts a rear surface of the moveable arm, the flexible mounting plate flexes to cause the pivot point associated the second hinge to translate away from the cavity area to a second position different from the retracted position.

2. The adjustable display housing assembly of claim 1, wherein the display panel housing is held against the rear surface of the moveable arm via a latch element.

3. The adjustable display housing assembly of claim 1, wherein when in a second viewing position, the display panel housing is positioned such that a top end of the display panel housing extends away and behind the second hinge, while a lower end of the display panel housing rests on an upper surface of the base housing and is positioned in front of a keyboard input area of the base housing.

4. The adjustable display housing assembly of claim 1, wherein articulation of the moveable arm past an interference point causes the flexible mounting plate and second hinge to extend away from the display panel housing.

5. The adjustable display housing assembly of claim 1, wherein the flexible mounting plate comprises a steel spring mounting bracket.

6. The adjustable display housing assembly of claim 1, wherein the flexible mounting plate is attached to a surface of the cavity area of the display panel housing.

7. The adjustable display housing assembly of claim 1, wherein the rear surface of the display panel housing is flush with the rear surface of the moveable arm when the moveable arm rests in the cavity area.

8. A portable electronic device comprising:
   a base housing having an input area and first hinge elements;
   an adjustable display housing assembly comprising:
      a panel housing having a recessed cavity area and second hinge elements;
      a support arm attached to the base housing and the first hinge elements at a first end, and to the panel housing and the second hinge elements at a second end opposite the first end; and
      a flexible mounting plate to attach the second hinge elements to the panel housing,
   wherein when the panel housing is in a closed position relative to the base housing, the support arm rests within the cavity area and a pivot point corresponding to the second hinge elements is retracted by the flexible mounting plate to a retracted position, and
   wherein when the display housing is in a reclined viewing position relative to the base housing, the pivot point corresponding to the second hinge elements is translated away from the cavity area to a second position different from the retracted position.

9. The portable electronic device of claim 8, wherein when the panel housing is in the reclined viewing position, a rear surface of the panel housing is in contact with a rear surface of the support arm.

10. The portable electronic device of claim 9, wherein articulation of the support arm past an interference point causes the flexible mounting plate and the second hinge elements to extend away from the panel housing.

11. The portable electronic device of claim 8, wherein when in an inclined viewing position, the panel housing is positioned such that a top end of the panel housing extends away and behind the second hinge elements while a lower end of the panel housing rests on an upper surface of the base housing and is positioned in front of a keyboard input area of the base housing.

12. The portable electronic device of claim 8, wherein the flexible mounting plate comprises a steel spring mounting bracket attached to a surface of the cavity area.

13. An adjustable display housing assembly comprising:
   a base housing having a keyboard input area;
   a display panel housing having a recessed cavity area formed in a rear surface of the display panel housing;
   a first hinge attached to the base housing;
   a moveable arm extending from the first hinge at a first end;
   a second hinge attached to the moveable arm at a second end opposite the first end; and
   a flexible spring mounting plate attaching the second hinge to the display panel housing;
   wherein when the display panel housing and the base housing are in a closed position, the moveable arm rests within the cavity area and the second hinge is retracted by the flexible mounting plate to a retracted position, and
   wherein when the display panel housing is in a reclined viewing position relative to the base housing, a rear surface of the display panel housing abuts a rear surface of the moveable arm and the second hinge is raised away from the cavity area to a second position different from the retracted position.

14. The adjustable display housing assembly of claim 13, wherein when the display panel housing is in an inclined viewing position, the display panel housing is positioned such that a top end of the display panel housing extends away and behind the second hinge, while a lower end of the display panel housing rests on an upper surface of the base housing and is positioned in front of the keyboard input area of the base housing.

15. The adjustable display housing assembly of claim 1, wherein when the pivot point is at the second position the second hinge is raised farther above the cavity area than when the pivot point is at the retracted position.

16. The adjustable display housing assembly of claim 15, wherein pivoting of the display panel housing in a first rotational direction relative to the moveable arm causes the display panel housing to engage the moveable arm at an interference point, and wherein the translating of the pivot point away from the cavity area allows further pivoting of the display panel housing in the first rotational direction relative to the moveable arm to the first viewing position.

17. The adjustable display housing assembly of claim 1, wherein when the display panel housing and the base housing are in the closed position, a front surface of the display panel housing abuts an upper surface of the base housing, and wherein the rear surface of the display panel housing is opposite of the front surface of the display panel housing.

18. The portable electronic device of claim 8, wherein when the pivot point is at the second position the second hinge elements are raised farther above the cavity area than when the pivot point is at the retracted position.

19. The portable electronic device of claim 8, wherein pivoting of the panel housing in a first rotational direction relative to the support arm causes the panel housing to engage the support arm at an interference point, and wherein the translating of the pivot point away from the cavity area allows further pivoting of the panel housing in the first rotational direction relative to the moveable arm to the reclined viewing position.

20. The adjustable display housing assembly of claim 13, wherein when the second hinge is at the second position the second hinge is raised farther above the cavity area than when the second hinge is at the retracted position.

21. The adjustable display housing assembly of claim 13, wherein pivoting of the display panel housing in a first rotational direction relative to the moveable arm causes the display panel housing to engage the moveable arm at an interference point, and wherein the raising of the second hinge away from the cavity area allows further pivoting of the display panel housing in the first rotational direction relative to the moveable arm to the first viewing position.

* * * * *